(12) United States Patent
Krueger et al.

(10) Patent No.: US 8,444,521 B2
(45) Date of Patent: May 21, 2013

(54) ADJUSTMENT FITTING

(75) Inventors: Frieder Krueger, Coburg (DE); André Blinzler, Grub am Forst (DE); Stephanie Hartleb, Weidhausen (DE); Juergen Siller, Roedental (DE); Michael Zellmann, Bischberg (DE); Matthias Weiss, Roedental (DE); Volker Moeller, Coburg (DE)

(73) Assignee: Brose Fahrzeugteile GmbH & Co. Kommanditgesellschaft, Coburg (DE)

( * ) Notice: Subject to any disclaimer, the term of this patent is extended or adjusted under 35 U.S.C. 154(b) by 213 days.

(21) Appl. No.: 12/966,922

(22) Filed: Dec. 13, 2010

(65) Prior Publication Data

US 2011/0138940 A1      Jun. 16, 2011

Related U.S. Application Data

(63) Continuation of application No. PCT/EP2009/004087, filed on Jun. 6, 2009.

(30) Foreign Application Priority Data

Jun. 13, 2008 (DE) .......................... 10 2008 028 096

(51) Int. Cl.
- *F16C 11/10* (2006.01)
- *F16H 55/18* (2006.01)
- *B60N 2/225* (2006.01)

(52) U.S. Cl.
USPC .......................................... 475/162; 297/362

(58) Field of Classification Search
USPC ................ 74/60, 640; 297/362; 475/162, 163
See application file for complete search history.

(56) References Cited

U.S. PATENT DOCUMENTS

| | | | | |
|---|---|---|---|---|
| 5,984,048 A | * | 11/1999 | Kiyosawa et al. | 184/6.12 |
| 6,918,635 B2 | * | 7/2005 | Finner et al. | 297/362 |

FOREIGN PATENT DOCUMENTS

| | | |
|---|---|---|
| DE | 10144840 A1 | 3/2003 |
| DE | 10 2005 053312 B3 | 12/2006 |
| DE | 10 2005 056728 B3 | 3/2007 |

* cited by examiner

*Primary Examiner* — William C Joyce
(74) *Attorney, Agent, or Firm* — Muncy, Geissler, Olds & Lowe, PLLC

(57) ABSTRACT

Adjustment fitting, in particular for a vehicle seat, comprising a first fitting part and a second fitting part that can be rotationally adjusted relative to the first fitting part about an axis of rotation. An external gear, which has internal teeth and into which an internal gear that is associated with the second fitting part and has external teeth is inserted like an eccentric gear, is associated with the first fitting part. The internal gear forms an eccentric receiving space towards the axis of rotation. The adjustment fitting further comprises an eccentric member that is rotatably inserted into the eccentric receiving space and is equipped with a drive shaft for driving the eccentric member, and a cap for covering the open receiving space. The cap is eccentrically designed relative to the axis of rotation, penetrates into the eccentric receiving space by means of an axially downward-pulled sealing edge, and seals the receiving space as the sealing edge is preloaded in a radially outward direction. The adjustment fitting is easy to mount, while the cap ensures a secure sealing action regardless of the axial height of the adjustment fitting.

18 Claims, 1 Drawing Sheet

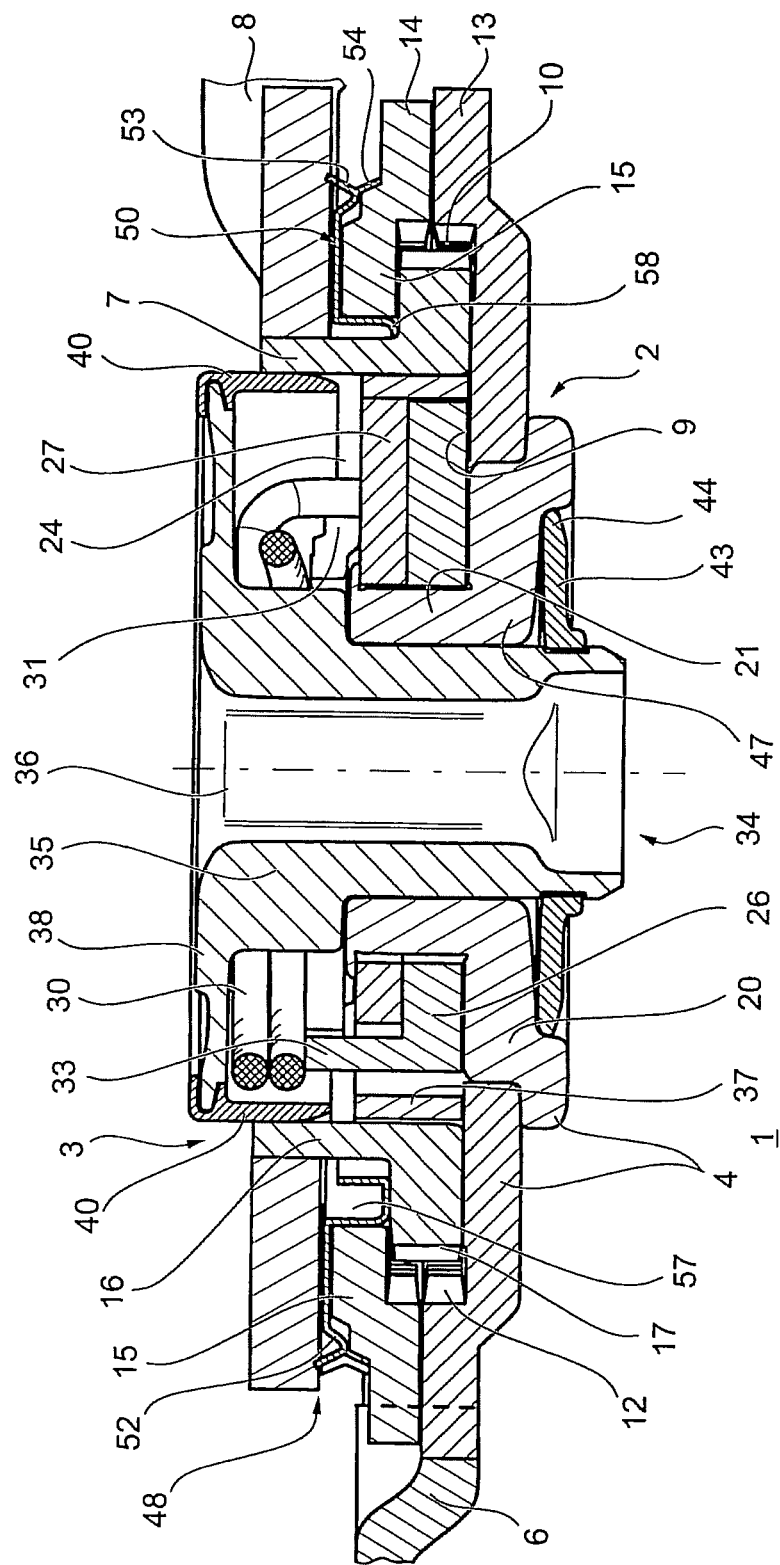

ADJUSTMENT FITTING

This nonprovisional application is a continuation of International Application No. PCT/EP2009/004087, which was filed on Jun. 6, 2009, and which claims priority to German Patent Application No. DE 10 2008 028 096.8, which was filed in Germany on Jun. 13, 2008, and which are both herein incorporated by reference.

BACKGROUND OF THE INVENTION

1. Field of the Invention

The invention relates to an adjustment fitting, in particular for a motor vehicle seat, having a first fitting part and a second fitting part that is rotationally adjustable relative to the first fitting part about an axis of rotation, wherein the first fitting part has associated with it an outer wheel with internal teeth, in which wheel is inserted, in the manner of a wobble mechanism, an inner wheel with external teeth that is associated with the second fitting part, and wherein the inner wheel forms a receiving space that is eccentric to the axis of rotation, having an eccentric cam rotatably inserted in the eccentric receiving space, having a drive shaft for driving the eccentric cam, and having a cap for covering the open receiving space.

2. Description of the Background Art

In an adjustment fitting of this nature, the first fitting part and the second fitting part are connected in the manner of a wobble mechanism, wherein the inner wheel rolls with its external teeth along the internal teeth of the outer wheel with a wobbling motion when the eccentric cam is driven. The number of teeth in the external teeth differs from the number of teeth in the internal teeth. One full rotation of the eccentric cam results in a rotation of the inner wheel relative to the outer wheel by the difference in tooth count. An adjustment fitting with wobble mechanism has become established in the automotive industry for adjusting the backrest relative to the seat base of a motor vehicle seat. A wobble mechanism can be implemented with relatively few mechanical parts, and permits flat construction together with a transmission ratio desirable for adjustment.

An adjustment fitting of the aforementioned type is known from DE 10 2005 053 312 B3, for example. The cap shown there can be clipped to the circumference of a rotary adjustment element by means of a radially flexible sealing lip, and seals the receiving space against a fitting part under axial preloading. The radially flexible sealing lip is intended to prevent rotation of the cap relative to the fitting part and thus loss of seal. Instead, the cap rotates relative to the rotary adjustment element.

A cap for the receiving space is also known from DE 101 44 840 B4 for an adjustment fitting of the aforementioned type. In this design, the cap is composed of a sealing ring and a cover plate, wherein the outer edge of the sealing ring seals against a fitting part under axial preloading. The sealing ring there slides on the fitting part when the fitting is actuated.

In addition, an adjustment fitting with a cap of the above-mentioned type is known from DE 10 2005 056 728 B3. Here, too, the edge of the cap covers the eccentric receiving space under axial preloading.

The prior art caps for covering the eccentric receiving space serve to keep dirt and other contaminants away from the joint region of the adjustment fitting. In particular, no paint should get into the interior of the adjustment fitting during painting operations.

This is because an adjustment fitting is typically painted prior to use by a dip painting process, in particular a cathodic dip painting process, in order to achieve improved corrosion resistance. In this process, penetration of paint into the interior of the fitting is to be avoided, since paint that gets inside can undesirably affect the mechanical parts that make up the transmission. Under some circumstances, this may result in impaired functionality of the adjustment fitting.

SUMMARY OF THE INVENTION

It is therefore an object of the invention to provide an adjustment fitting that exhibits improved sealing of the eccentric receiving space.

According to an embodiment, the cap is designed to be eccentric to the axis of rotation, and an axially extended sealing rim thereof projects into the eccentric receiving space, sealing the receiving space under radially outward-directed preloading of the sealing rim.

The invention departs from the previous concept of the prior art of sealing the eccentric receiving space with a cap that lies flat against the fitting part and that rests against the fitting part under axial preloading. Because the cap is designed to be eccentric to the axis of rotation, an axially extended sealing rim thereof can project into the interior of the eccentric receiving space and seal the receiving space under radial preloading. In this design, the shape of the cap is largely matched to the circumference of the receiving space. In particular, the cap is designed as a plate that is eccentrically offset relative to the axis of rotation. The sealing rim with radially outward-directed preloading, which can in particular be designed as a sealing lip equipped with a contour, provides both static sealing in the case of painting and dynamic sealing in the case of actuation of the adjustment fitting. In the latter case, the sealing rim slides along the inside of the eccentric receiving space.

Because of the departure from axial preloading of the cap against a fitting part, there is no need for clips or latching mechanisms for sealing, with which, for example, the cap is supported on the drive shaft to produce the axial preloading. Moreover, the invention offers the significant advantage that no variant-specific adaptation of the cap is required in the case of different axial heights of the adjustment fitting, which can result, e.g., from adapters of different thicknesses. In the case of a cap sealed by axial preloading, it must be manufactured specifically for each variant in order to seal against adapters of different thicknesses that are attached to the outer or inner wheel. In contrast, the cap described here projects with the axially extended sealing rim into the eccentric receiving space, so that with a suitable length of the sealing edge, a single cap can easily compensate for different axial heights of the adjustment fitting or different thicknesses of the adapter without compromising seal integrity. Radial sealing is not affected by an axial offset. The invention thus offers the ability to reduce the number of variants, which is associated with a significant cost savings.

The cap and the sealing rim can be made of plastic. The sealing rim can be molded onto the cap, in particular by means of a two-component injection molding process. In this way the sealing rim is connected to the cap in a captive manner.

As regards the material for the sealing rim, basically any elastomer is suitable as long as it is dimensionally stable enough and, in particular, withstands a cathodic dip painting process. In particular, the material should withstand temperatures of up to approximately 200° C. A suitable plastic or rubber is possible as the material. Preferably, a polyamide is used as the material for the sealing rim.

In another embodiment of the adjustment fitting, the inner wheel includes an inner wall that is extended in an axial direction past the external teeth, wherein the sealing rim projects inside the inner wall and seals the receiving space under a radial preloading directed toward the inner wall. The provision of such an inner wall permits especially easy attachment of an adapter, since the inner wheel is made very easily accessible by this means. Moreover, this design embodiment offers another option for becoming independent of the adapters required for different motor vehicle seats. The receiving space is sealed with respect to the outside by means of the sealing edge pressed against the inner wall (also called a rim in technical jargon) of the inner wheel. The extension of the inner wall past the external teeth has the further advantage that the adapter can be displaced in the axial direction for attachment. This, too, permits customer-specific variation of the adjustment fitting without the need for its components to be adapted in a variant-specific manner.

The drive shaft can be designed as a continuous bearing journal. This facilitates assembly of the adjustment fitting. Such a bearing journal also offers the ability to hold the components of the adjustment fitting together in the axial direction.

The cap and the bearing journal can be designed as a single piece. As compared to known caps from the prior art, this design eliminates the need to attach the cap to an adjusting element, in particular through the use of clips or latches. Such a one-piece design is now made possible because the sealing of the receiving space takes place in the radial direction. Moreover, the one-piece design reduces manufacturing costs. The assembly of the adjustment fitting is simplified, as well.

In another embodiment of the adjustment fitting, the outer wheel includes a floor with a central bore, in which the end of the bearing journal facing away from the cap is mounted, wherein the bearing journal is held against the floor by a locking disk, and wherein the locking disk includes a sealing rim that covers the radial gap between the bearing journal and the floor under preloading directed axially toward the floor. The locking disk thus acts as a cover for the "back" of the adjustment fitting, since it covers the rear, radial gap between the bearing journal and the floor of the outer wheel. Since the locking disk holds the adjustment fitting, it is advantageous for the locking disk to be mechanically supported by a reinforcing element, in particular an embedded steel element. Once again, the sealing rim of the locking disk can be made of a suitable elastomer.

The floor on the sides facing the locking disk can be recessed in a saucer shape. For one, this reduces the axial height of the adjustment fitting. Secondly, it ensures secure rear sealing of the receiving space.

For stable mounting, the floor can include an elongated collar surrounding the bore, in which collar the bearing journal is mounted. The mounting of the bearing journal is stabilized through the support surface of the elongated collar, which is enlarged in the axial direction. In particular, tilting of the bearing journal is reliably prevented in this way.

In an embodiment, a central seal can be placed in the axial gap between the fitting parts. This idea originates from the previous practice of providing permanent caps for sealing the open axial accesses to the interior space and of using grease for sealing gaps in the adjustment fitting that likewise constitute an access to the receiving space to prevent the entry of paint. With this practice, however, it is possible for the interior space of the adjustment fitting to be contaminated with cleaning fluid as early as the pretreatment of the adjustment fitting. Grease can then be inadvertently washed out during the dip painting itself, so that paint can nevertheless enter. Moreover, escaped grease leads to quality impairment during the painting process. Furthermore, only "paint-compatible" grease can be used in the fitting, which is associated with cost disadvantages.

It has now been found that the axial gap between the fitting parts that is necessary for relative rotation, which perforce constitutes an access to the eccentric receiving space of the adjustment fitting, is suitable for permanent sealing. If a central seal is placed in the axial gap between the first and second fitting parts, the access to the outer annular space between the inner wheel and the outer wheel is sealed off. Penetration of dirt and, in particular, paint, through the outer annular space between the inner wheel and the outer wheel during the painting process is thus reliably and permanently prevented, without giving rise to the problems described with respect to sealing by means of grease. In this design, the fitting parts slide along the central seal during adjustment of the fitting. The central seal thus serves both as a static and a dynamic seal. The invention thus provides a possible way to achieve further sealing of the transmission parts of the adjustment fitting in order to reliably prevent the entry of dirt and, in particular, paint, into the receiving space during the painting process.

As to the material for the central seal, basically any elastomer is suitable as long as it is dimensionally stable enough and, in particular, withstands a cathodic dip painting process. In particular, the material should withstand temperatures of up to approximately 200° C. A suitable plastic or rubber is possible as the material. Preferably, a polyamide is used as the material for the central seal. The central seal can fill part of the axial gap, or can fill it completely.

As mentioned, type-specific adapters or adapter plates are joined to the outer and/or inner wheel, for example by welding, in particular by laser welding, for installation of the adjustment fitting on specific vehicle seats. In particular, the inner wheel is preferably joined circumferentially to an adapter plate that is spaced apart from the outer wheel by an axial gap. Preferably, the central seal is placed in the axial gap between the adapter and the outer wheel in this design.

In an embodiment, the central seal can be designed in a disk shape with an outer sealing rim, wherein the outer sealing rim has an essentially Y-shaped cross-section with legs pointing radially outward and branching axially apart, which legs spread between the first and second fitting parts, in particular between the outer wheel and the adapter. As a result of this design, dirt and, in particular, paint, is reliably kept from penetrating into the aforementioned axial gap. The interior space of the adjustment fitting is protected.

It is further embodiment, the outer wheel can include an outer wall that is extended in the axial direction beyond the internal teeth and overlaps the external teeth of the inner wheel with a radially inward facing collar, wherein the central seal has an inner axial sealing rim that is placed in the collar. The extended outer wall and the overlap with the external teeth of the inner wheel can also take place in particular by means of a two-piece design of the outer wheel. In this design, the outer wheel is divided at the internal teeth, so that, in a sense, a top shell and a bottom shell are produced. The external teeth of the inner wheel are then securely supported or guided between the top and bottom shells. Alternatively, the overlap with the extended outer wall can also take place by means of a retaining element which follows the internal teeth of the inner wheel in the axial direction in the outer wall of the outer wheel, and is attached, in particular welded, to the outer wall at an appropriate position. This offers the additional possibility of adjusting the axial clearance between the inner and outer wheels.

The inner axial sealing rim of the central seal is then placed in the outer wall of the outer wheel. In this way, rotation and slippage of the central seal relative to the outer wheel is prevented. Assembly is also simplified in this way.

In a useful manner, the inner axial sealing rim of the central seal terminates in an end that is curved radially inward. In this way the region of the teeth is additionally protected from welding spatter.

Further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole illustrates an example embodiment, showing a cross-sectional view of an adjustment fitting with sealing of the eccentric receiving space.

DETAILED DESCRIPTION

Visible in the cross-sectional depiction in FIG. 1 is an adjustment fitting 1, which includes a first fitting part 2 and a second fitting part 3, which are rotationally adjustable relative to one another about an axis of rotation. The first fitting part 2 includes an outer wheel 4, to which is attached, in particular by welding, a suitable backrest adapter 6 for later installation on a seat backrest. The second fitting part 3 includes an inner wheel 7 and a seat adapter 8 connected thereto for attachment to a seat base.

The outer wheel 4 is designed as a ring gear with a floor 9 and an outer wall 10, wherein internal teeth 12 are provided on the outer wall 10. The outer wheel 4 is divided along the internal teeth 12, and is composed of a first shell 13 and a second shell 14. A circumferential collar 15 of the second shell 14 engages around the external teeth 17 provided on a raised inner wall 16 of the inner wheel 7. In this way, the inner wheel 7 is securely held axially between the first shell 13 and the second shell 14 of the outer wheel 4. In addition, the outer wheel 4 has a separately inserted dome 20, which bears a circumferential elongated collar 21. The design of a separate dome 20 offers the possibility of optimizing the different tribological properties with regard to mounting and transmission through appropriate selection of materials.

Formed between the elongated collar 21 and the raised inner wall 16 of the inner wheel 7 is an eccentric, annular receiving space 24 in which a first eccentric cam part 26 and a second eccentric cam part 27 are placed for driving the inner wheel 7. Under rotation, the two eccentric cam parts 26, 27 form a variable overall eccentricity and are preloaded by means of a spring element 30 to produce a maximum overall eccentricity. In this preloaded starting position, the external teeth 17 of the inner wheel 7 are pressed against the internal teeth 12 of the outer wheel 4 without play in the direction of maximum eccentricity, so that runout of the fitting parts 2, 3 relative to one another is not possible.

For actuating the eccentric cam parts 26, 27, a carrier plate 31 in which the carrier projections 33 of the respective eccentric cam parts 26, 27 engage, is also placed in the eccentric receiving space 24. The carrier plate 31 is attached in a rotationally fixed manner to the central drive shaft 34, which in the present case is designed as a continuous bearing journal 35. When the bearing journal 35 is driven or rotated, the eccentric cam parts 26, 27 are rotated against the preloading of the spring element 30 via the carrier plate 31 attached in a rotationally fixed manner, so that the inner wheel 7 now rests against the outer wheel 4 with play. The overall eccentric cam composed of the eccentric cam parts 26, 27 can be rotated, with the external teeth 17 of the inner wheel 7 rolling on the internal teeth 12 of the outer wheel 4. One full rotation of the eccentric cam results in a rotation of the inner wheel 7 relative to the outer wheel 4 corresponding to a difference in tooth count between the external teeth 17 and the internal teeth 12.

In order to drive the bearing journal 35, the journal has a square opening 36 on its top side. Provided on the opposite side is a receptacle for a further shaft which is provided for driving a corresponding adjustment fitting on the other side of the vehicle seat if desired.

To reduce the friction between the eccentric cam parts 26, 27 and the inner wheel 7, a plain bushing 37 is placed in the inner circumference of the inner wheel 7.

The bearing journal 35 is designed as a single piece with a cap 38, which seals the eccentric receiving space 24 with respect to the outside. The cap 38 is designed in the shape of a disk and is offset radially with respect to the drive shaft 34. In other words, the cap 38 is eccentric in design. The eccentric cap 38 additionally includes a sealing rim 40 that is drawn axially downward, which projects inside the eccentric receiving space 24. By means of preloading directed radially outward toward the inner wall 16 of the inner wheel 7, the circumferential sealing rim 40 seals the eccentric receiving space 24 with respect to the outside. The sealing rim 40 is made of a moldable elastomer, and is molded onto the bearing journal 35 by means of a two-component injection molding process. It can be seen that the axial length of the sealing rim 40 is dimensioned such that different variants of the adjustment fitting 1, which differ in axial height, can be sealed with one and the same bearing journal 35. An axial offset of the sealing rim 40 with respect to the inner wall 16 within a certain limit does not change the sealing function. In particular, this also applies to the case where the axial sealing wall 40 does not seal against the inner wall 16 of the inner wheel 7, but rather directly against a circumferential rim of the seat adapter 8.

On the side facing away from the cap 38, the bearing journal 35 is held on the adjustment fitting 1 by means of a locking disk 43. The fitting parts 2, 3 are axially held together by the outer wheel 4 implemented as a ring gear. The locking disk 43 has a circumferential sealing rim 44, and is held in a saucer-shaped recess 47 of the floor 9 or of the separate dome 20. Axial preloading of the sealing rim 44 with respect to the floor 9 is achieved by means of a clip attachment of the locking disk 43 to the bearing journal 35. As a result, not only does the locking disk 43 hold the bearing journal 35 in the adjustment fitting 1, it also seals the radial gap between the bearing journal 35 and the dome 20. On this side, too, penetration of dirt and, in particular, penetration of paint during the painting process is thus reliably prevented.

The seat adapter 8, in the form of a seat adapter plate, is attached circumferentially, in particular welded, to the inner wall 16 of the inner wheel 7. The backrest adapter 6 is spaced axially away from the outer wheel 4 in order to permit rotation relative to one another. In addition, a disk-shaped central seal 50 is placed in the resultant axial gap 48 between the seat adapter 8 and the outer wheel 4. In this way, the interior of the adjustment fitting 1 is fully sealed with respect to the outside.

Neither dirt nor paint can enter the internal transmission parts through the outer annular gap between the inner wheel 7 and the outer wheel 4, as well.

The disk-shaped central seal 50 also has an outer sealing rim 52 with an essentially Y-shaped cross-section. Here, the two legs 53, 54 of the outer sealing rim 52 extend radially outward and brace axially against the seat adapter 8 and against the outer wheel 4. In this way, dirt and, in particular, paint, is reliably prevented from penetrating the interior space of the adjustment fitting 1 through the axial gap 48.

In addition, the central seal 50 has an inner axial sealing rim 57 with which it is placed in the collar 15 of the outer wheel 4. By this means, rotation of the central seal 50 relative to the outer wheel 4 is prevented. The inner sealing rim 57 has an inwardly curved end 58. By this means, the internal transmission of the adjustment fitting 1 is protected from welding spatter during the manufacturing process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjustment fitting for a motor vehicle seat, comprising:
   a first fitting part;
   a second fitting part that is rotationally adjustable relative to the first fitting part about an axis of rotation;
   an outer wheel associated with the first fitting part, the outer wheel having internal teeth,
   an inner wheel configured to be insertable in the outer wheel in the manner of a wobble mechanism, the inner wheel having external teeth that are associated with the second fitting part, the inner wheel forming a receiving space that is eccentric to the axis of rotation;
   an eccentric cam rotatably inserted in the eccentric receiving space;
   a drive shaft configured to drive the eccentric cam; and
   a cap configured to cover the open receiving space and configured to be eccentric to the axis of rotation, the cap having an axially extended sealing rim that projects from an end of the cap into the eccentric receiving space and the cap being configured to seal the receiving space under a radially outward-directed preloading of the sealing rim.

2. The adjustment fitting according to claim 1, wherein the sealing rim is molded onto the cap.

3. The adjustment fitting according to claim 1, wherein the inner wheel includes an inner wall that is extended in an axial direction past the external teeth, and wherein the sealing rim projects inside the inner wall and seals the receiving space under a radial preloading directed toward the inner wall.

4. The adjustment fitting according to claim 1, wherein the drive shaft is configured as a continuous bearing journal.

5. The adjustment fitting according to claim 4, wherein the cap and the bearing journal are designed as a single piece.

6. The adjustment fitting according to claim 4, wherein the outer wheel includes a floor with a central bore, in which an end of the bearing journal facing away from the cap is mounted, wherein the bearing journal is held against the floor by a locking disk, and wherein the locking disk includes a sealing rim that covers the radial gap between the bearing journal and the floor under preloading directed axially toward the floor.

7. The adjustment fitting according to claim 6, wherein the floor on the side facing the locking disk is recessed in a saucer shape.

8. The adjustment fitting according to claim 6, wherein the floor includes an elongated collar surrounding the bore, in which collar the bearing journal is mounted.

9. The adjustment fitting according to claim 1, wherein a central seal is placed in an axial gap between the first fitting part and the second fitting part.

10. The adjustment fitting according to claim 9, wherein the inner wheel is joined circumferentially to an adapter, and wherein the central seal is placed in a resultant axial gap between the adapter and the outer wheel.

11. The adjustment fitting according to claim 9, wherein the central seal is designed in a disk shape with an outer sealing rim, wherein the outer sealing rim has an essentially Y-shaped cross-section with legs pointing radially outward and branching axially apart, which legs spread between the first and second fitting parts.

12. The adjustment fitting according to claim 9, wherein the outer wheel includes an outer wall that is extended in the axial direction beyond the internal teeth and overlaps the external teeth of the inner wheel with a radially inward facing collar, and wherein the central seal has an inner axial sealing rim that is placed in the collar.

13. The adjustment fitting according to claim 12, wherein the inner axial sealing rim terminates in an end that is curved radially inward.

14. The adjustment fitting according to claim 9, wherein the central seal is designed in a disk shape with an outer sealing rim.

15. The adjustment fitting according to claim 1, wherein the seal rim abuts against a surface of the inner wheel.

16. The adjustment fitting according to claim 1, wherein the seal rim abuts against a surface of the inner wheel within the receiving space.

17. The adjustment fitting according to claim 1, wherein the cap comprises a plate that is eccentrically offset relative to the axis of rotation.

18. The adjustment fitting according to claim 1, wherein the cap lies flat against the first fitting part and/or the second fitting part.

* * * * *